DICODE DECODER WITH INTERRUPTED FEEDBACK

Filed Sept. 14, 1966 3 Sheets-Sheet 1

INVENTOR.
DONALD E. MACK
STEPHEN E. TOWNSEND
BY
Anthony D. Cennamo
ATTORNEYS

DICODE DECODER WITH INTERRUPTED FEEDBACK

Filed Sept. 14, 1966 3 Sheets-Sheet 2

INVENTOR.
DONALD E. MACK
STEPHEN E. TOWNSEND
BY
Anthony D. Cennamo
ATTORNEYS

DICODE DECODER WITH INTERRUPTED FEEDBACK

Filed Sept. 14, 1966 3 Sheets-Sheet 3

INVENTOR.
DONALD E. MACK
STEPHEN E. TOWNSEND
BY Anthony D. Cennamo
ATTORNEYS

United States Patent Office 3,462,695
Patented Aug. 19, 1969

3,462,695
DICODE DECODER WITH INTERRUPTED FEEDBACK

Stephen E. Towsend and Donald E. Mack, Rochester, N.Y., assignors to Xerox Corporation, Rochester, N.Y., a corporation of New York Filed Sept. 14, 1966, Ser. No. 579,302
Int. Cl. H03k *5/20*
U.S. Cl. 328—119 10 Claims

ABSTRACT OF THE DISCLOSURE

A dicode decoder which discriminates between true signals and noise pulses by integrating a dicode signal, detecting transitions through the medium value of the integrated signal and clamping the integrated signal except when input signals or noise is present.

This application relates to a pulse decoding circuit and method adapted for use in receiving data sets.

Data set is a term which has come to indicate the apparatus used to couple binary or digital type transmitters and receivers to a communications link. At the transmitter location, the data set converts a two-level input signal, from a device such as a computer or facsimile transmitter, into some other form lying in the same baseband frequency domain, but which is more compatible with the transmission link. At the receiving location, which may be thousands of miles away, the data set receives the transmitted signals from the transmission link, and decodes them into a replica of the original two-level signal for utilization by a facsimile receiver, or the like. The transmission link may also include various modulators and demodulators. The decoding problem at the receiving location is difficult because the transmission link, whatever its nature, adds various types of natural and man-made noise to the transmitted signal and may be subject to fading as well.

Copending Mack applications Ser. Nos. 419,151 and 419,156, filed Dec. 17, 1964, disclose improved means for decoding dicode signals in the presence of noise by integrating a dicode signal, detecting transitions through the median value of the integrated signal, and by providing a latching feedback signal to the integrator in the form of either a fixed or variable amplitude two-level signal to provide further immunity against the integration and detection of unipolarity noise pulses. In accordance with said applications, however, it was necessary to employ a feedback loop of long time constant and limited effectiveness in order to permit the integrator to perform its intended function. We have now improved upon the previous inventions and made it possible to use stronger feedback and obtain greater noise immunity by disabling the feedback whenever an input signal is being integrated.

Accordingly, it is an object of the invention to provide improved means and methods for decoding signals, particularly the type known as dicode signals, in the presence of noise.

It is a further object to provide decoding means and methods exhibiting improved rejection of unipolarity noise pulses. Subsidiary objects will become apparent upon reading this specification.

In general, we accomplish our objectives by integrating a dicode signal, detecting transitions through the median value of the integrated signal and providing a latching feedback loop that is disabled when the input signal exceeds a predetermined minimum absolute value.

For a more detailed description of the invention, reference will be had to the accompanying drawings in which.

Figure 1:
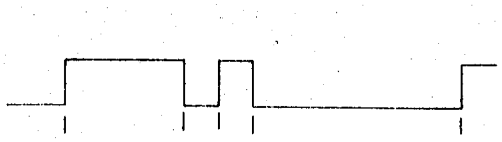
FIG. 1 represents a typical binary waveform.
Figure 2A:
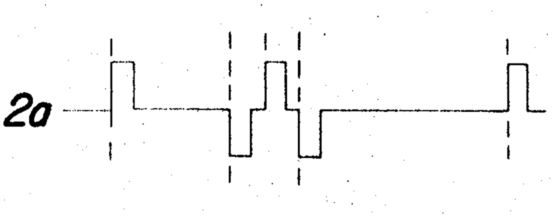
FIGS. 2A and 2B represent dicode versions of FIG. 1.

FIG. 1 represents an arbitrary two-level waveform representative of signals which are desired to be transmitted over long distances. FIG. 2A shows the waveform of FIG. 1 after passing through a common type of transmitting data set. Each positive going transition of FIG. 1 has been replaced by a positive pulse of fixed amplitude and width and each negative going transition of FIG. 1 has been replaced by a negative pulse of the same amplitude and width. This type of coding is known as "dicode." It is a three-level type of signal comprising equal positive and negative pulses superimposed upon a base line voltage. It is equally applicable to synchronous or non-synchronous signals. The waveform of FIG. 2A is normally filtered, either before or during transmission, to remove the higher frequency components. This results in the waveform of FIG. 2B which is representative of the waveform which would appear at a receiving data set in the absence of noise. It is the function of the receiving data set to decode the waveform of FIG. 2B back to the waveform of FIG. 1 as reliably as possible and with as little phase jitter as possible. This invention is concerned with a circuit and method adapted to decode or translate a waveform of the type shown in FIG. 2B to a waveform of the type shown in FIG. 1.

Figure 2B:
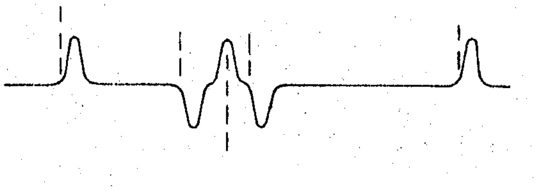
Figure 3:
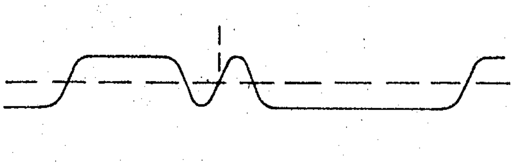
FIG. 3 represents an integrated dicode waveform.

FIG. 3 shows the dicode waveform of FIG. 2B after it has been integrated by any suitable integrating means. This integrated waveform is a measure of pulse energy. More precisely speaking, energy is proportional to the time integral of the signal voltage squared, but we have not found it necessary or desirable to square the signal waveform. It can be seen that the peaks of the pulses of FIG. 2B correspond in general to midpoints in the waveform of FIG. 3. Accordingly, such a midpoint represents half the energy of the pulse of FIG. 2B and also represents a suitable criterion for determining the presence of a signal pulse. If the waveform of FIG. 3 is symmetrical around zero potential, then every zero crossing in FIG. 3 will be indicative of a received dicode pulse. A dashed line is included in FIG. 3 to represent a median or ground potential. In general, the integrated value of random short noise pulses will not be sufficient to cause the waveform of FIG. 3 to execute a zero crossing and be detected as spurious pulses.

Figure 4:
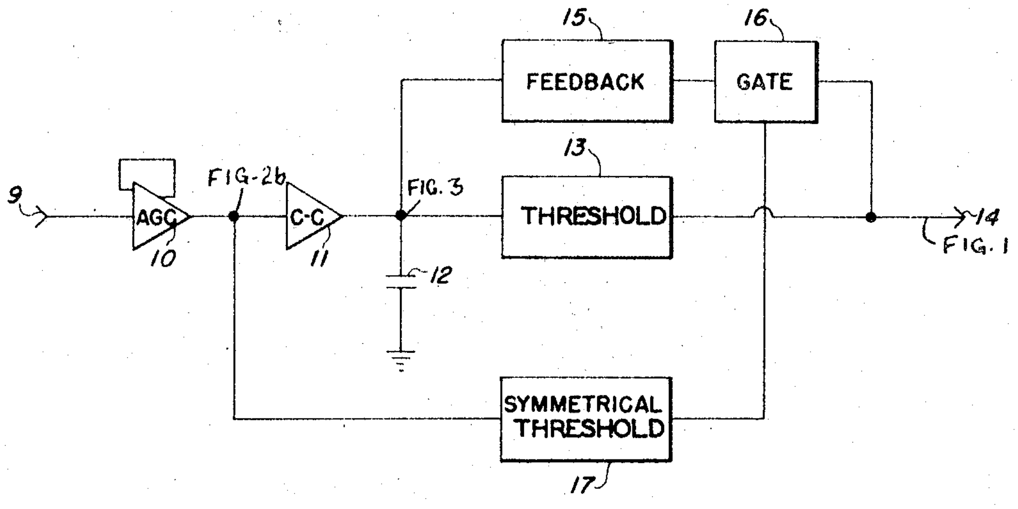
FIG. 4 is a block diagram of one form of the invention.

FIG. 4 is a block diagram of an arrangement of circuits which may be used to carry out the decoding scheme generally suggested above. The dicode signal appearing at input terminal 9 has first passed through an automatic gain control amplifier 10 to compensate for gain variations in the transmission circuit and provide a signal having uniform signal pulse amplitudes. The next step is to integrate the signal. This may be done in various ways. The conventional way is to convert the input voltage waveform into a corresponding current waveform and apply this current to a capacitor. A high value resistor will convert a voltage into a current under appropriate conditions, but there is illustrated a constant current amplifier 11 which provides an output current proportional to input voltage and substantially independent of output voltage. This current from amplifier 11 is supplied to an integrating capacitor 12 to produce a waveform similar to that of FIG. 3. This waveform is then applied to a threshold circuit 13 to recreate at output terminal 14 a two-level signal corresponding to that of FIG. 1. The term "threshold circuit" is used in this specification and the claims to indicate a circuit or device having two output levels, one for input signals below a reference threshold level and the other for input signals above the same reference threshold level. A Schmitt trigger circuit is one common embodiment of threshold circuit 13. A simple grounded emitter transistor amplifier will also function as a threshold circuit since its collector potential will be at either the emitter potential or the collector supply potential depending upon whether the base potential is greater than or less than the emitter potential. There is, of course, a limited range of base potential in which the collector potential responds linearly rather than stepwise, but if the input signal is large enough, it is possible to ignore this limited range of linear operation and consider a grounded emitter transistor or similar devices as constituting threshold circuits within the meaning of this specification.

The circuit as described to this point gives good rejection of randomly occurring noise signals for the reason previously described. However, a series of small noise pulses having the same polarity may be integrated by capacitor 12 to a potential above the threshold of circuit 13 to give a false output signal, even though the amplitude or energy of the individual noise pulses is substantially less than that of a true signal pulse. Immunity to this type of noise is provided by feedback circuit 15 which provides feedback current to capacitor 12 in a positive sense from the output of threshold circuit 13. Feedback circuit 15 may be a conductor or a simple resistance network which provides an exponential type of restoration to capacitor 12. The effect of feedback circuit 15 is to cause the potential on capacitor 12 to return towards the previous value after each noise pulse. More specifically, the potential on capacitor 12 is returned towards one of two specific values determined by threshold circuit 13 and feedback circuit 15. From a different point of view, the difference between the two-level output signal and the voltage on capacitor 12 is integrated and added to the voltage already on capacitor 12. Feedback circuit 15 should be adjusted so that the potential on capacitor 12 responds at least about as rapidly in response to an increment of voltage on the capacitor itself as to an increment of voltage applied at the input of amplifier 11. This adjustment of feedback circuit 15 is made possible through the use of a gate 16 which disconnects the feedback circuit 15 whenever capacitor 12 is in the process of integrating an input signal. This prevents feedback circuit 15 from interfering with the normal function of this circuit to generate output transitions in response to input pulses of normal size. Gate 16 is controlled by the output of a symmetrical or absolute value threshold circuit 17 which is supplied with signals from the input of amplifier 11. Threshold circuit 17 generates an output signal to open gate 16 whenever the absolute value of the input signal exceeds a predetermined threshold amplitude, which should be small compared to the normal peak signal amplitude appearing at the input of amplifier 11.

Figure 5:
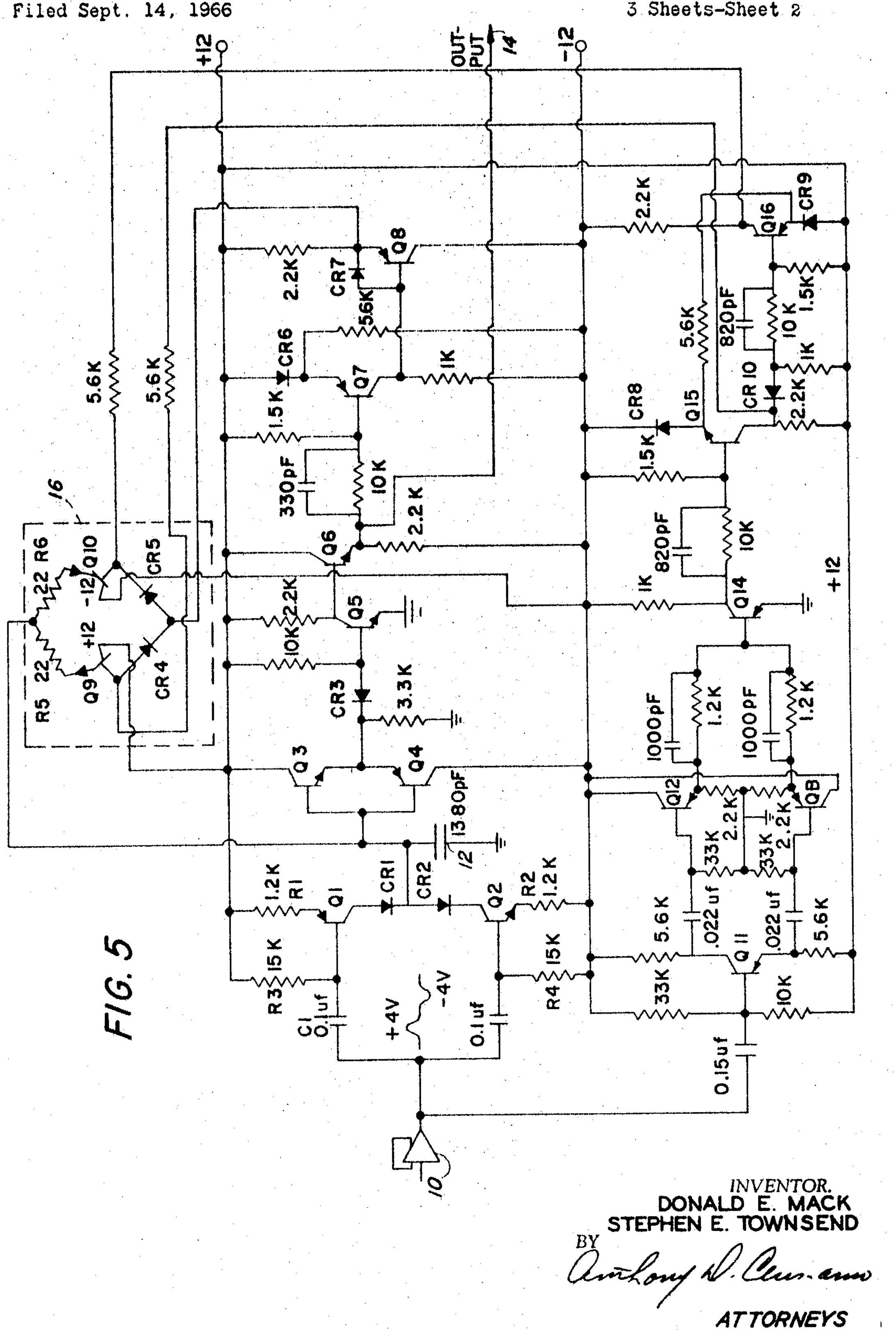
FIG. 5 is an electrical circuit diagram corresponding to FIG. 4.

FIG. 5 represents a specific illustrative circuit corresponding to the block diagram of FIG. 4. The NPN and PNP transistors can be of type 2N1304 and 2N1305, respectively. Automatic gain control amplifier 10, shown schematically, should provide an output voltage of eight volts peak-to-peak. Transistors Q1 and Q2 and associated components comprise the constant current amplifier 11 of FIG. 4. Q1 is a PNP transistor and Q2 is an NPN transistor. Their collectors are connected to integrating capacitor 12 through diodes CR1 and CR2 which minimize loading on capacitor 12. It is characteristic of a high gain transistor that the emitter and collector currents are substantially equal. It is also characteristic of a transistor amplifier that the base-to-emitter voltage is small and essentially constant. Accordingly, the emitter current in Q1 is essentially the base voltage divided by the emitter resistor R1 and, similarly, the emitter and collector current of Q2 is the base voltage divided by the emitter resistor R2. R1 and R2 are normally equal to each other. If the input signal does not contain any D.C. component, as is true of dicode signals, it is convenient to A.C. couple the input signals to the bases of transistors Q1 and Q2 by coupling capacitors C1 and C2, respectively. This, in turn, permits the transistor bases to be referenced to the plus and minus supply voltages by base resistors R3 and R4, respectively. The time constant of C1 and R3 and of C3 and R4 is made long enough to pass the input pulses without distortion. In general, transistor Q1 will supply capacitor 12 with a current proportional to negative input pulses and transistor Q2 will supply capacitor 12 with a current proportional to positive input pulses. The voltage on capacitor 12 will thus be the negative integral of the voltage supplied by automatic gain control amplifier 10.

The voltage on capacitor 12 is passed, via a high input impedance emitter follower composed of transistors Q3 and Q4 and through diode CR3 to the base of transistor Q5. Since the emitter of Q5 is grounded, its collector potential switches between ground potential and the positive supply potential as its base potential passes through a potential of a few tenths of a volt positive. A comparable fraction of a volt is added by CR3 to the emitter follower output, so that the base of Q5 passes through its switching potential when the emitter follower output passes through zero. Since Q5 is an NPN transistor, its collector potential falls to zero when its base potential is positive and its collector potential rises to the value of the positive supply voltage when the base voltage is negative. Accordingly, Q5 functions as a threshold circuit and the collector of Q5 is connected through emitter follower Q6 to the output terminal 14.

Since the potential at the emitter of Q6 varies in a direction opposite to that at capacitor 12, this potential is applied through a voltage divider to a common emitter transistor Q7. In order to assure positive turn off of Q7, its emitter is returned to a potential which is a few tenths of a volt more negative than the positive supply voltage by virtue of the forward voltage drop across diode CR6. Thus, the potential at the collector of Q7 is either substantially equal to the positive supply voltage or substantially equal to the negative supply voltage and is in phase with the potential on capacitor 12. The collector of Q7 is connected to the input of emitter follower Q8, the output of which is connected through gate 16 back to capacitor 12. A diode CR7 insures that Q8 will have a very low output impedance regardless of whether it is turned on or off. Accordingly, when gate 16 is opened, capacitor 12 always tries to charge up to or down to the collector potential of Q7. This provides the impulse noise rejection previously referred to.

The voltage developed on capacitor 12 by transistors Q1 and Q2 cannot exceed the negative or positive supply voltages. The output voltage of automatic gain control amplifier 10 is so adjusted relative to transistors Q1 and Q2 and associated components that some limiting actually takes place during each integration of a positive or negative input signal pulse. In other words, the input signals slightly exceed the linear integrating capability of transistors Q1 and Q2 and capacitor 12. This represents a desirable, although not an essential operating condition, because each input pulse causes the voltage on capacitor 12 to be integrated upwards or downwards from a fixed, predetermined potential.

The feedback circuit always tries to restore the potential on capacitor 12 to a value essentially determined by the positive or negative supply potential applied to transistor Q7. For efficient operation of the circuit, these potentials should be symmetrical about zero and at least approximately equal to the potentials to which capacitor 12 is driven by normal input pulses. Since the feedback circuit tends to clamp the potential at capacitor 12 at a fixed potential between input signals, this function can be substituted for the limiting function performed by transistors Q1 and Q2. In other words, transistors Q1 and Q2 can be supplied with supply voltages higher than those supplied to Q7, or the input signal can be reduced in amplitude from the eight volts previously described. FIG. 5 shows a particular operating condition where transistors Q1, Q2 and Q7 are all operated from the same supply potential. The input signal to transistors Q1 and Q2 is selected so that its integrated value at capacitor 12 is close to that of the supply voltages applied to transistors Q1, Q2 and Q7 and, preferably, slightly above.

The input signal from amplifier 10 is also applied to a phase inverted transistor Q11, the outputs of which are connected to transistors Q12 and Q13. Any input signal above a very low threshold value will cause either Q12 or Q13 to conduct, depending upon the polarity of the input signal. The emitters of Q12 and Q13 are coupled to the base of grounded emitter transistor Q14, so that Q14 will be turned on whenever either Q12 or Q13 is turned on. When Q14 is turned on, it biases NPN transistor Q15 to the on state and Q15 biases NPN transistor Q16 on through a coupling diode CR10. Diodes CR8 and CR9 insure that Q15 and Q16 are solidly turned off except when Q14 conducts. Diode CR10 permits the collector potential of Q15 to return rapidly to the collector supply potential when Q15 is turned off. The collector outputs of Q15 and Q16 constitute a push-pull signal which appears only when a voltage above a minimum absolute threshold value is applied to Q11. This output is used, through resistors R7 and R8, to switch on gate 16 which is a modified diode gate consisting of diodes CR4 and CR5 and transistors Q9 and Q10. Transistors Q9 and Q10 are employed to obtain a high switching speed and the capability of passing a large feedback current for a fast time constant without having to draw a large current through transistors Q7, or Q15 and Q16. Resistors R5 and R6 insure that only one of the transistors Q9 and Q10 is on at any time. In the illustrated embodiment, the effective resistance of the feedback circuit is $$\approx\frac{R_7}{\beta+1}\approx\frac{R_8}{\beta+1}=\frac{5.6K}{\beta+1}$$

where $\beta$ is the current gain of transistors Q9 and Q10. Assuming a reasonable value for $\beta$, the RC time constant of the feedback circuit is about $10^{-7}$ seconds. Gate 16 is described in greater detail in simultaneously filed application Ser. No. 579,395, entitled Amplified Gate Circuit.

With such a short time constant, the feedback circuit functions to instantaneously reset the voltage on capacitor 12 to the positive or negative power supply voltage and to hold it at such voltage. However, whenever an input pulse appears, whether a true diode pulse or a noise pulse, gate 16 opens and the feedback circuit is disabled and the input signal is integrated on capacitor 12. If the integrated value of the signal exceeds the predetermined value, then a voltage transition appears at output 14 and the voltage on capacitor 12 is reset to a new value and held there. If, however, the integrated signal is insufficient to meet the detection requirement, capacitor 12 will be instantaneously reset at the end of the signal to its previous value.

Figure 6:
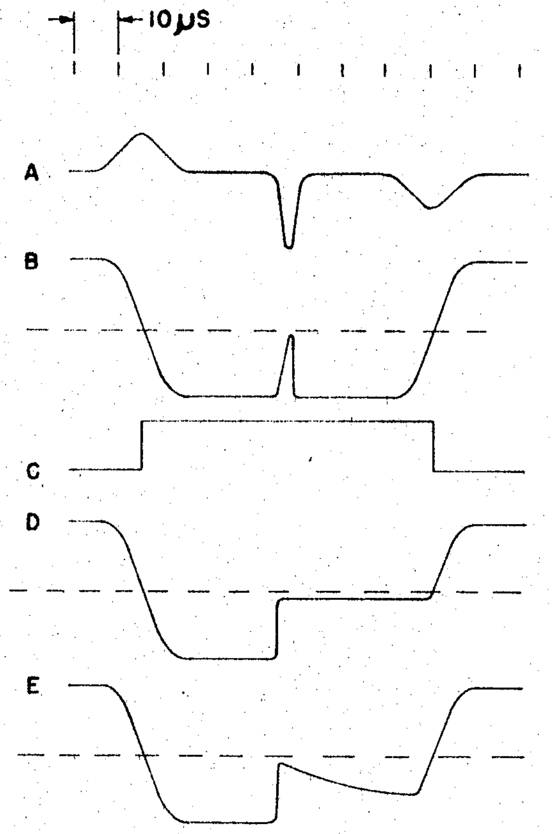
FIG. 6 illustrates waveforms obtained from the circuit of FIG. 5.

FIG. 6 shows some of the waveforms obtained with the circuit of FIG. 5. Waveform A represents a dicode signal with a superimposed noise pulse. Waveform B shows the voltage on capacitor 12. The integrated noise pulse is insufficient to be detected as a true signal, even though its amplitude is approximately twice that of a true signal pulse. Waveform C is the output signal which appears at terminal 14. It can be seen from the rapid resetting of capacitor 12, as shown in waveform B, that a sequence of noise pulses will not cause false detection of a signal, because the effect of successive pulses is not cumulative on capacitor 12. Waveform D shows for comparison the voltage on capacitor 12 in the absence of any feedback at all. Although the noise pulse is too small to be detected as a signal, it is apparent that a second noise pulse of the same polarity will further raise the voltage on capacitor 12 and cause a false signal detection. Waveform E is illustrative of the voltage on capacitor 12 with feedback but in the absence of any means to interrupt the feedback. The illustrated long feedback time constant must be employed to permit the voltage on capacitor 12 to be altered only by an incoming signal. Some immunity against successive noise pulses of the same polarity is obtained, but obviously not of the same order as can be obtained with the present invention.

Figure 7:
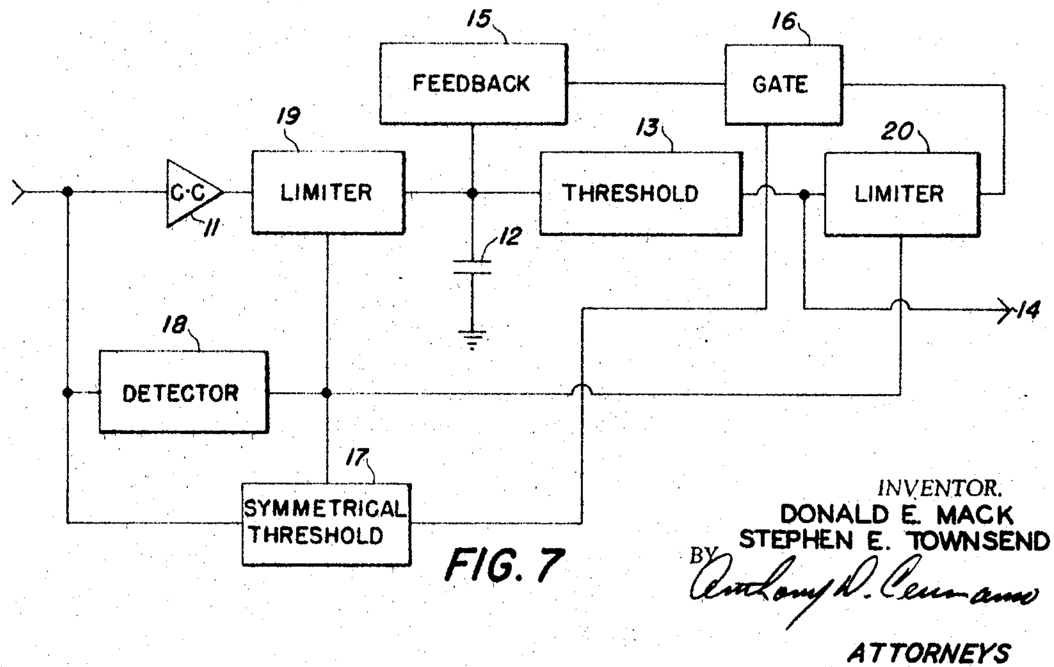
FIG. 7 is a block diagram of a different form of the invention.

FIG. 7 is a block diagram of an embodiment of our invention in which automatic gain control amplifier 10 may be dispensed with, even though the input signals vary in amplitude due to fading or other causes. This embodiment incorporates certain features of previously filed application Ser. No. 419,151, which is incorporated by reference. This embodiment further includes a detector circuit 18 which generates a D.C. output voltage proportional to the peak-to-peak amplitude of the received signals. It is desirable, although not altogether essential, to incorporate a limiter circuit 19 which is responsive to the output of detector 18 to limit the maximum amplitude of the integrated signal on capacitor 12 in proportion to the amplitude of received signals. A very simple way of realizing this circuit function comprises supplying transistors Q1 and Q2 of a circuit like that of FIG. 5 with supply voltages derived from detector 18 and proportional to the received signal voltage.

Detector 18 also controls the operation of a limiter circuit 20 which makes the feedback signal likewise proportional to the amplitude of received signals. This circuit function can be realized in a manner similar to that of limiter 19 by supplying the transistor which generates the feedback signal with supply voltages proportional to input signals. It is also desirable, although not essential, that the threshold of symmetrical threshold circuit 17 also be made proportional to the amplitude of received signals. The illustrated but undescribed circuits perform the same function as their counterparts in FIG. 5. The operation of FIG. 7 is thus rendered substantially independent of input signal amplitude while still preserving the noise rejection features of the present invention.

Although the feedback signal in the circuits of FIGS. 4, 5, and 7 is derived from a threshold circuit 13 which generates the decoded output signal, it is apparent that the feedback signal can be derived directly from capacitor 12 through the use of additional threshold circuits or the like. The illustrated embodiments are more economical, however, since a single threshold circuit performs a dual function. Since many variations may be made in the described and illustrated circuits without departing from the teaching of the invention, the scope of the invention is to be determined solely by the following claims.

What is claimed is:

1. The method of decoding a three-level dicode signal comprising integrating said dicode signal to form an integrated dicode signal, generating a first fixed amplitude two-level signal from said integrated dicode signal, said first two-level signal being determined by the sign of the difference between said integrated dicode signal and a fixed potential, integrating the difference between said integrated dicode signal and a second two-level signal determined by the sign of the difference between said integrated dicode signal and said fixed potential when said input signal is absent to form an integrated error signal, and adding said integrated error signal to said integrated dicode signal to form a sum thereof.

2. The method of claim 1 wherein said first and second two-level signals are identical.

3. The method of claim 1 wherein said second two-level signal is proportional in amplitude to the amplitude of said dicode signals.

4. The method of claim 1 in which the sum of said integrated signals is symmetrically limited to a fixed absolute value.

5. A dicode signal decoding system comprising:
a current generator circuit adapted to provide an output current proportional to the voltage of a dicode input signal;
an integrating capacitor connected to said current generator circuit;
a threshold circuit connected to said integrating capacitor and having a switching threshold at the median potential of said capacitor;
a positive feedback circuit connected between the output of said threshold circuit and said capacitor;
an absolute value threshold circuit responsive to said input signal; and
gate circuit means connected in said feedback circuit and responsive to said absolute value threshold circuit to disable said feedback circuit when the absolute value of said input signal exceeds a predetermined value.

6. The system of claim 5 wherein said threshold circuit includes means for generating signals of constant amplitude.

7. The system of claim 5 wherein said threshold circuit includes means for generating signals of variable amplitude proportional to the average amplitude of said dicode signals.

8. A dicode signal decoding system comprising:
a current generator circuit adapted to provide an output current proportional to the voltage of a dicode input signal;
an integrating capacitor connected to said current generator circuit;
a threshold circuit connected to said integrating capacitor and having a switching threshold at the median potential of said capacitor wherein the output of said threshold circuit has a variable amplitude proportional to the average amplitude of said dicode signals;
a positive feedback circuit connected between the output of said threshold circuit and said capacitor;
an absolute value threshold circuit responsive to said input signal;
gate circuit means connected in said feedback circuit and responsive to said absolute value threshold circuit to disable said feedback circuit when the absolute value of said input signals exceeds a predetermined valve; and
a further threshold circuit connected to said integrating capacitor and having a fixed amplitude output.

9. The system of claim 5 in which said feedback circuit comprises a series impedance.

10. The system of claim 5 further including a symmetrical limiter connected to said integrating capacitor.

References Cited

UNITED STATES PATENTS

| | | | |
|---|---|---|---|
| 3,187,196 | 6/1965 | Corbell et al. | 307—290 |
| 3,225,213 | 12/1965 | Hinrichs et al. | 307—217 |

JOHN S. HEYMAN, Primary Examiner

U.S. Cl. X.R.

307—235, 313; 328—28, 115, 127; 340—347